United States Patent [19]

Rusk

[11] Patent Number: 4,460,162
[45] Date of Patent: Jul. 17, 1984

[54] TORCH GUIDING SYSTEM FOR FLAME CUTTING OF PIPE

[76] Inventor: Richard W. Rusk, Rte. #1, Box 336, Simpson Dr., Waldorf, Md. 20601

[21] Appl. No.: 549,770

[22] Filed: Nov. 8, 1983

Related U.S. Application Data

[63] Continuation-in-part of Ser. No. 341,821, Jan. 22, 1982, Pat. No. 4,414,041.

[51] Int. Cl.$^3$ .......................... B23K 7/04; B23K 7/10
[52] U.S. Cl. ...................................... 266/56; 266/67; 266/68
[58] Field of Search ................... 266/54, 56, 67, 68

[56] References Cited

U.S. PATENT DOCUMENTS

| | | | |
|---|---|---|---|
| 2,851,265 | 9/1958 | Cink | 266/56 |
| 3,572,669 | 3/1971 | Brand | 266/56 |
| 3,975,003 | 8/1976 | Buford | 266/56 |

*Primary Examiner*—Wayland W. Stallard
*Attorney, Agent, or Firm*—John F. McClellan, Sr.

[57] ABSTRACT

An improved guide for cutting-off and/or bevelling pipe with a torch using a ring-shaped member with circular guide-surfaces fixed around the pipe, includes the ring-shaped member circumference forming axially spaced first and second rim-and-ledge tracks engaged respectively by wheels of frame-mounted outer bogies; inner bogies positioned for running on the inner surface of the ring mount to the outer bogies resiliently to accommodate irregularities in the tracks; the frame has first and second ends for holding torch-carrying depth-adjustment mechanisms with the torch respectively at 37 degrees to the axis of the work and at 90 degrees to the axis of the work, as selected; provisions permitting rotation of the torch about the flame axis and quick attachment-detachment of the torch are disclosed.

16 Claims, 4 Drawing Figures

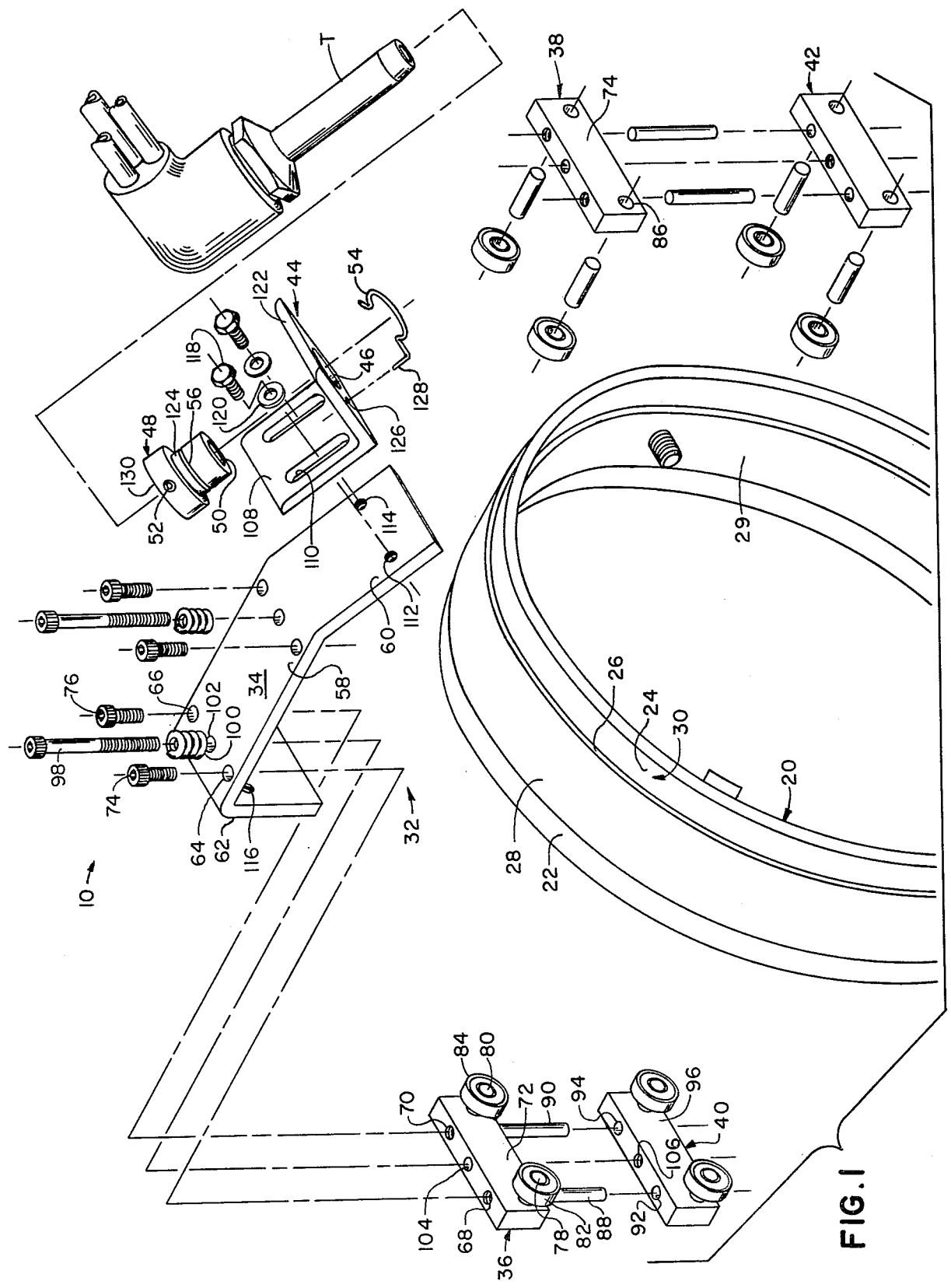

TORCH GUIDING SYSTEM FOR FLAME CUTTING OF PIPE

This application is a continuation in part of my copending application Ser. No. 341,821, filed Jan. 22, 1982 for GUIDE SYSTEM FOR FLAME CUTTING OF PIPE; with issue date Nov. 8, 1983 as U.S. Pat. No. 4,414,041.

FIELD OF THE INVENTION

This invention relates generally to tool systems and particularly to an improved torch guiding system for flame cutting of pipe.

SUMMARY OF THE INVENTION

Straight lengths of pipe are commonly joined by butt-welding. Large numbers of butt-welded joints are made every day, worldwide, in relation to almost every industry.

To prepare for making such a joint, one or both lengths of pipe to be joined must be cut to exact length and the ends prepared to receive the weld. Usually the end of each pipe is bevelled at 37°, so that abutting ends of the two pipes forms a symmetrical "V" groove of 74° included angle all around the joint to receive the welding bead, multiple passes being usually employed.

Bevels are usually formed on pipe ends either by machining, when unusual accuracy and smoothness are required, despite expense, or by use of gas cutting torch. A gas cutting torch such as an oxy-acetylene torch has the advantages of being quick, economical, lightweight, compact and easily maneuvered, but it requires years of experience to produce accurate and smooth results in pipe bevelling with a torch.

A guide has been described for use in flat plate cutting with a gas torch, in U.S. Pat. No. 4,273,313 issued on June 16, 1981 to John M. DeNardo for GUIDE FOR A CUTTING TORCH. This patent discloses a cam with a convex axial face for installation on a torch tip to guide on a flat plate in cutting flat work.

In addition, large, complex, heavy automatic equipment for pipe bevelling by flame is known.

In brief summary given as cursive description only and not as limitation, the invention of my referenced U.S. Patent includes an annular-track ring-member applicable by two pads and a screw, at 120° to each other, around a pipe that is to be bevelled by a gas cutting torch, and a follower for holding the gas cutting torch tip coacting with the annular track member to guide manual manipulation of the gas cutting torch in bevelling a pipe. The coaction is by hand-holding of the follower to the annular track, permitting rotation of the gas cutting torch for start-up to produce an offset hole, and also during bevelling operations for hose and hand clearance, comfort and convenience, without causing roughness of cut.

The system of my referenced U.S. Patent required some degree of talent on the part of the user in co-ordination of torch and guide. Professionals can use it best. The system of the present invention is intended to be safer, faster and to produce better results for rank amateurs as well as others, in that the elements constrain the torch at all times during operation, although with quick torch release handy.

Principal objects of the invention in addition to those indicated are to provide a system as described which can be easily adapted for use in bevelling or in cutting off any size pipe, which requires no unusual materials or close tolerances, which is usable overhead and in tight quarters, with or without rotation of the pipe being worked, and which is versatile and econonical to use.

Yet a further important object is to provide a system as described which will become improved standard equipment in commerce for the purpose of bevelling of pipe by manually manipulated gas cutting torches.

BRIEF DESCRIPTION OF THE DRAWINGS

The above and other objects and advantages of this invention will become more readily apparent on examination of the following description, including the drawings in which like reference numerals refer to like parts.

FIG. 1 is an exploded, partly fragmentary, perspective view of the invention;

DETAILED DESCRIPTION

Figure 3:
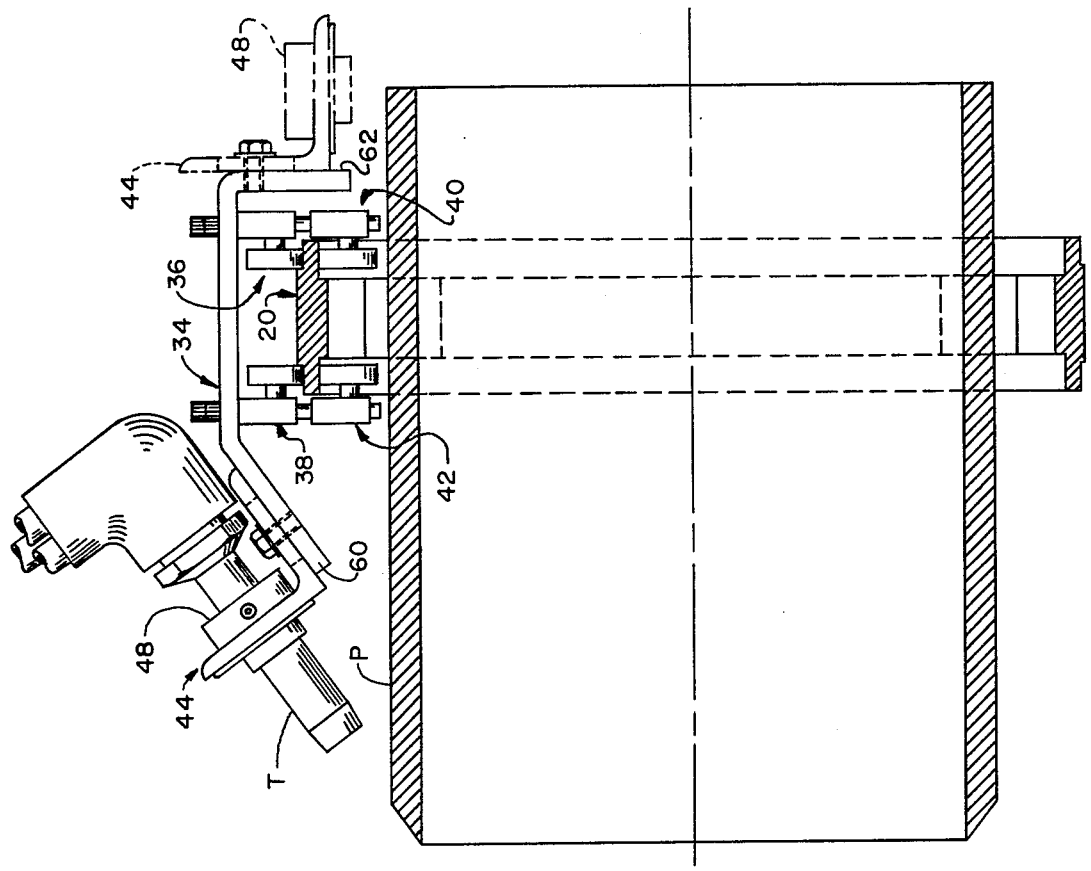
FIG. 3 is a side elevational view thereof; partly in section.

FIG. 1 shows the invention in embodiment 10. Ring 20 is shown fragmentarily. It is shaped to fit around the work; usually it is circular and held in spaced, concentric relation around a circular-section pipe to be flame-bevelled and/or cutoff, by supporting pads and screw to be described as part of the ring. The ring is preferably symmetrical about a central plane transverse to the axis.

First and second rims 22, 24 are cylindrical, reduced-thickness, uniform-width rim portions around the outer edges of the ring. These and the respective radial ledges 26 (shown) formed between them by the thicker cylindrical outer circumference 28 of the ring serve as guiding track structure or tracks 30 for the manual movement therearound of torch-carrying assembly 32 that runs on and is retained by the torch. Extra thickness 29 on the inner circumference is merely an option for added stiffness.

The torch carrying assembly 32 includes a frame 34 connected to the ring 20 by means of the outer bogies 36, 38 that are configured for rolling on the track structures, and by resiliently retaining, similar, inner bogies 40, 42 that roll on the inner surface of the ring and eliminate need for manual constraint of the assembly to the ring.

The frame 34 in turn adjustably mounts angle 44, which in hole 46 holds rotatable spool 48, which secures any conventional torch T to the assembly by means of a hole 50 in the spool in which the torch is fixed by a set screw 52, a means for adjusting torch position relative to the pipe axis. Wire clip 54 that engages a circumferential groove 56 in the spool 48 when the spool is in hole 46, attaches the spool and provides a means for quick detachment of the spool, and with it the torch held by the spool, and with the spool provides means permitting rotation of the torch about the axis of the flame.

Frame 34 has central flat 58 with a first or substantially 37° inclined end 60 for use in setting torch angle in bevelling of pipe, and a second or substantially 90° (or perpendicular) end 62 for use in setting torch angle for square cutoff of pipe. The frame may be made of bent strap aluminum.

Details of preferred fastening of the parts are as follows:

A pair of clearance holes 64, 66 at each end of central flat 58 matches aligned tapped holes 68, 70 in the edge of each respective rectangular, longitudinal, circumferentially extending bar 72, 74 of the outer bogies 36, 38 which screws 74, 76 mount to the frame 34. Each end of each bar has an axle 78, 80 transversely through it, mounting a wheel 82, 84 or ball bearing assembly, on the inboard side, by press fit of each axle as in hole 86.

Extending down from the bottom edge of each bar, preferably from holes 68, 70 or pilot hole portions thereof, preferably secured in press fit, are two rod guides 88, 90 that slidably engage matching clearance holes 92, 94 in a bar 96 of each inner bogie 40, 42.

A long screw 98 with a spring 100 under the head, or equivalent resilient means, passes down through a clearance hole 102 in the frame, through a clearance hole 104 centrally between holes 68 and 70 in each bar of each outer bogie 36, 38 and into a matching tapped hole 106 in each bar of the inner bogies.

By this means, each inner bogie is resiliently mounted to the frame and resiliently drawn in generally radial alignment toward a respective outer bogy with one of the rims 22, 24 of the ring 20 between. This yielding adjustment provides means for preventing jamming on debris and for smoothing passage of the torch carrying assembly or wagon around the track of the ring, regardless of imperfection in ring manufacture or minor damage to the tracks.

The inner bogies may be identical to the outer bogies except for the noted differences in tapped holes and clearance holes.

Angle 44 is a 90° angle. As an adjustable frame-fitting provision for movement of a torch towards and away from the ring axis, the first leg 108 has preferably two longitudinal slots, 110 shown, parallel with each other, matching two tapped holes, 112, 114 in the 37° end of the frame. The 90° end 62 of the frame has two similar tapped holes, 116 shown, for the same purpose. Screws 118 that preferably have washers 120 adjustably clamp the angle 44 in position on a selected end of the frame.

The second leg 122 of the angle has the previously mentioned hole 46 in it for receiving the smaller diameter portion 124 of spool 48, and a smaller hole 126 for receiving a bent end 128 end of wire clamp 54. The spool smaller diameter portion 124 passes through the hole 46 until the larger diameter spool portion 130 rests on the upper surface of the angle leg 122. In that position it may be affixed rotatably about the long axis by retentive engagement of a loop of the wire clamp with a groove 56 of the spool below leg 122, and of bent end 128 of the wire clamp with the hole 126 in leg 122. When it is desired to remove the spool, and a torch T held in it by axial hole 50 and setscrew 52, spool-retaining wire clamp 54 is simply swung away. At all times in use the torch T can be rotated about the axis of the nozzle portion, making gripping it comfortable, and swinging hose out-of-the-way, at any angle, overhead or in tight quarters, convenient.

Adjustment to accommodate different torch nozzle lengths, or different flame conditions or other variables, simply requires sliding the angle to desired position and tightening the affixing screws 118.

Larger and smaller pipes can be accommodated by different-size rings and by the torch adjustment indicated.

Figure 2:
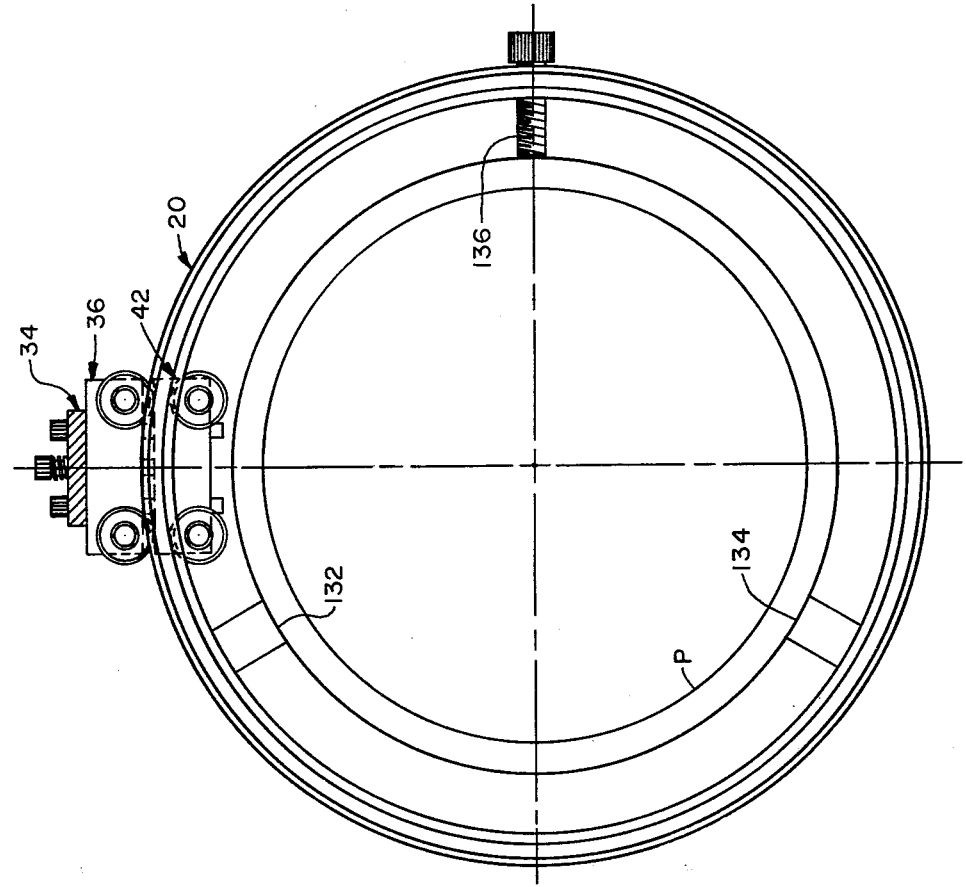
FIG. 2 is an end elevational view, partly in section, of the invention in use.

FIG. 2 shows in end or axial view the relation of the work P on which the ring 20 is mounted coaxially by means of the fixed pads 132, 134 and a radial adjustment screw 136, all at 120°. to the torch-positioning frame 34 mounted on the inner and outer bogies, 36 and 42 shown.

FIG. 3 shows the relation of the torch T to work P provided by inclined end 60 (or when the assembly is turned about, by perpendicular end 62) of the frame 34, that is held by bogies 36, 38, 40, 42 to ring 20. Angle 44 and spool 48 are in broken lines in the alternative position.

Figure 4:
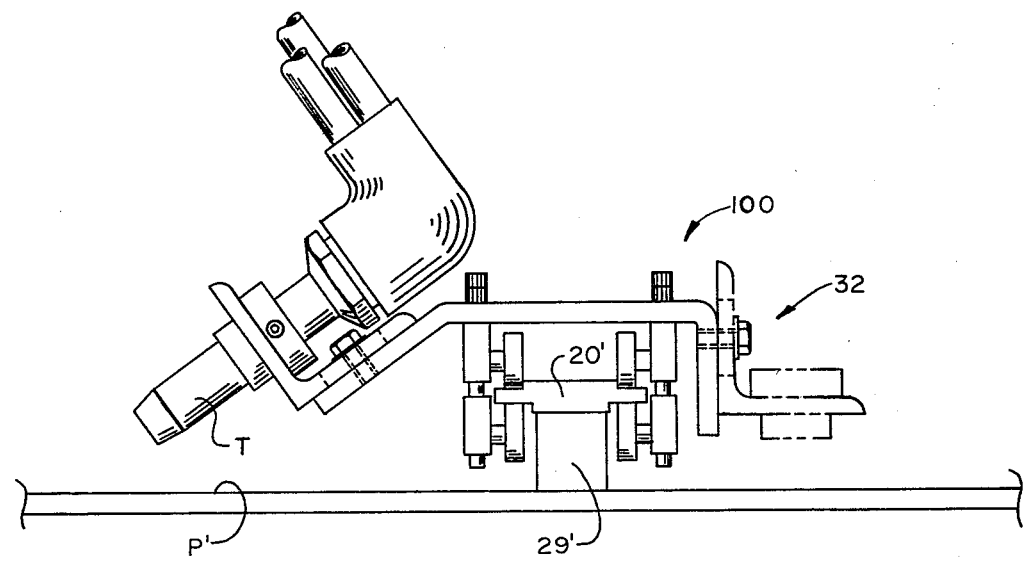
FIG. 4 is an end elevational detail.

FIG. 4 shows that embodiment 100 with a member 20' like ring 20, except flat, supported by blocks, 29' shown, and with a torch carrying assembly 32 mounted on it, the invention can be used to cut flat plate P'.

All parts may be of metal except for the wheels, preferably of aluminum, for lightness; the wheels may be, as noted, simply ball bearings of the sealed type and press fitted or otherwise mounted on stub axles. Setting the distance between coaxial wheels of the outer bogy for steady and close guiding on the ledges requires only a slight pressing or hammer-tapping of the axles (or either of the axles) press-fitted in the bars after assembly, a most convenient means and one loosening manufacturing tolerances at this point to a large fraction of an inch.

If desired, any number of lengths of element 20 can be connected end-to-end by dovetails or any other suitable conventional connections.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for guiding a torch for shaping a pipe end with flame from the torch and having: a ring with track structure, a torch-carrying assembly with a portion configured for manual movement around the ring guiding on the track structure, means for mounting the ring coaxially about the pipe, means permitting rotation of the torch about the axis of said flame, and means for adjusting torch position relative to the pipe axis, the improvement comprising: means for connecting the torch carrying assembly to the ring for permitting said manual movement free of manual constraint of the torch-carrying assembly to the ring, and means for detachably attaching a torch for carriage by said torch carrying assembly.

2. In a system as recited in claim 1, the means for connecting including a frame, the outer circumference of the ring having track structure; said portion configured including first means for rolling on the track structure; second means for rolling on the inner circumference of the ring, and means for mounting the first means for rolling and the second means for rolling to the frame.

3. In a system as recited in claim 2, the means for mounting the second means for rolling being resilient means for mounting.

4. In a system as recited in claim 3, the frame having a first end and a second end, and a respective first means for rolling and second means for rolling located adjacent each end of the frame.

5. In a system as recited in claim 2, each first means for rolling being in radial alignment with a respective second means for rolling.

6. In a system as recited in claim 3, the means for mounting including guiding rod structure between said first and second means for rolling.

7. In a system as recited in claim 6, each of said first and second means for rolling including a longitudinal member extending circumferentially of said ring, and a wheel at each end of the longitudinal member.

8. In a system as recited in claim 7, each wheel having anti-friction bearing means.

9. In a system as recited in claim 2, the means for adjusting torch position including means for setting angle of a said torch relative to a said pipe.

10. In a system as recited in claim 9, the means for setting angle including the first end of the frame having a portion inclined at an angle to the axis of said ring, and the means for detachably attaching including torch holding mechanism having provision for adjustably fitting said portion inclined at an angle.

11. In a system as recited in claim 10, said angle being substantially 37°.

12. In a system as recited in claim 10, the means for setting angle further including the second end of the frame having a portion substantially perpendicular to the axis of said ring, and said torch holding mechanism having provision for adjustably fitting said substantially perpendicular portion.

13. In a system as recited in claim 12, said adjustable fitting provision adjustment being towards and away from the axis of the ring.

14. In a system as recited in claim 2, the means for detachably attaching a torch including said means permitting rotation of a torch and comprising: the frame having at least one tapped hole, a member with a hole therein, slot structure in said member located for screw attachment to said at least one tapped hole in the frame, a spool having a hole therethrough, the spool having a smaller diameter proportioned for fitting the hole in said member and a larger diameter portion, a groove around the smaller diameter portion, and a clip proportioned for quick engagement and disengagement with said groove when said smaller diameter portion is inserted through the hole in said member with said larger diameter portion against the member with the hole therein.

15. In a system as recited in claim 2, said track structure including a respective rim at each end of said ring, ledge structure separating the rims; and a respective said first means for rolling positioned for rolling on each rim.

16. In a system as recited in claim 15, means for adjusting spacing between said respective first means for rolling to conform to the separation of said rims.

* * * * *